June 30, 1931.  K. M. SIMPSON  1,812,563
METALLURGICAL PROCESS
Filed Feb. 24, 1931  3 Sheets-Sheet 2

Inventor
Kenneth M. Simpson
By Bacon & Thomas
Attorneys

June 30, 1931.  K. M. SIMPSON  1,812,563
METALLURGICAL PROCESS
Filed Feb. 24, 1931  3 Sheets-Sheet 3

Inventor
Kenneth M. Simpson
By Bacon & Thomas
Attorneys

Patented June 30, 1931

1,812,563

UNITED STATES PATENT OFFICE

KENNETH M. SIMPSON, OF NEW YORK, N. Y., ASSIGNOR TO INTERNATIONAL CHROMIUM PROCESS CORPORATION, OF NEW YORK, N. Y., A CORPORATION OF DELAWARE

METALLURGICAL PROCESS

Application filed February 24, 1931. Serial No. 517,945.

The invention relates to improvements in furnaces and their method of operation.

The invention is particularly useful in the art of metallurgy for the production of steel, iron, ferrochrome, and other metals and alloys.

An object of the invention is to provide a process and apparatus for increasing the capacity and raising the efficiency of the open-hearth type of furnace by a novel method of directing and distributing the furnace flames. In the preferred embodiment of my invention, the foregoing advantages may be obtained by subjecting substantially the entire surface of the charge to the action of downwardly directed, impinging flame.

With a hearth of a substantial size, I preferably provide a series of downwardly directed flames to substantially cover the entire surface thereof. It is desirable that the heating flames be at substantially their maximum temperature at the point of contact with the surface of the charge.

In carrying out the process, it is desirable that the downwardly moving flames impinge on the surface of the charge when moving with considerable velocity.

In the preferred embodiment of the invention, the heating flames impinge on the surface of the charge while moving in substantially a vertical plane.

Other important objects of the invention are to provide independent regulation of the individual flame temperatures; the use of short intense heating flames favorable for the attainment of high temperatures; and to obtain substantially the maximum heat release from the flame within the charge.

The invention is herein disclosed and described for the manufacture of steel, iron and other metals and alloys, but it will be understood that its field of use extends to other arts where high furnace temperatures are desirable.

In the drawings, Figure 1 represents a plan view of an apparatus capable of carrying out the process;

Figure 1:
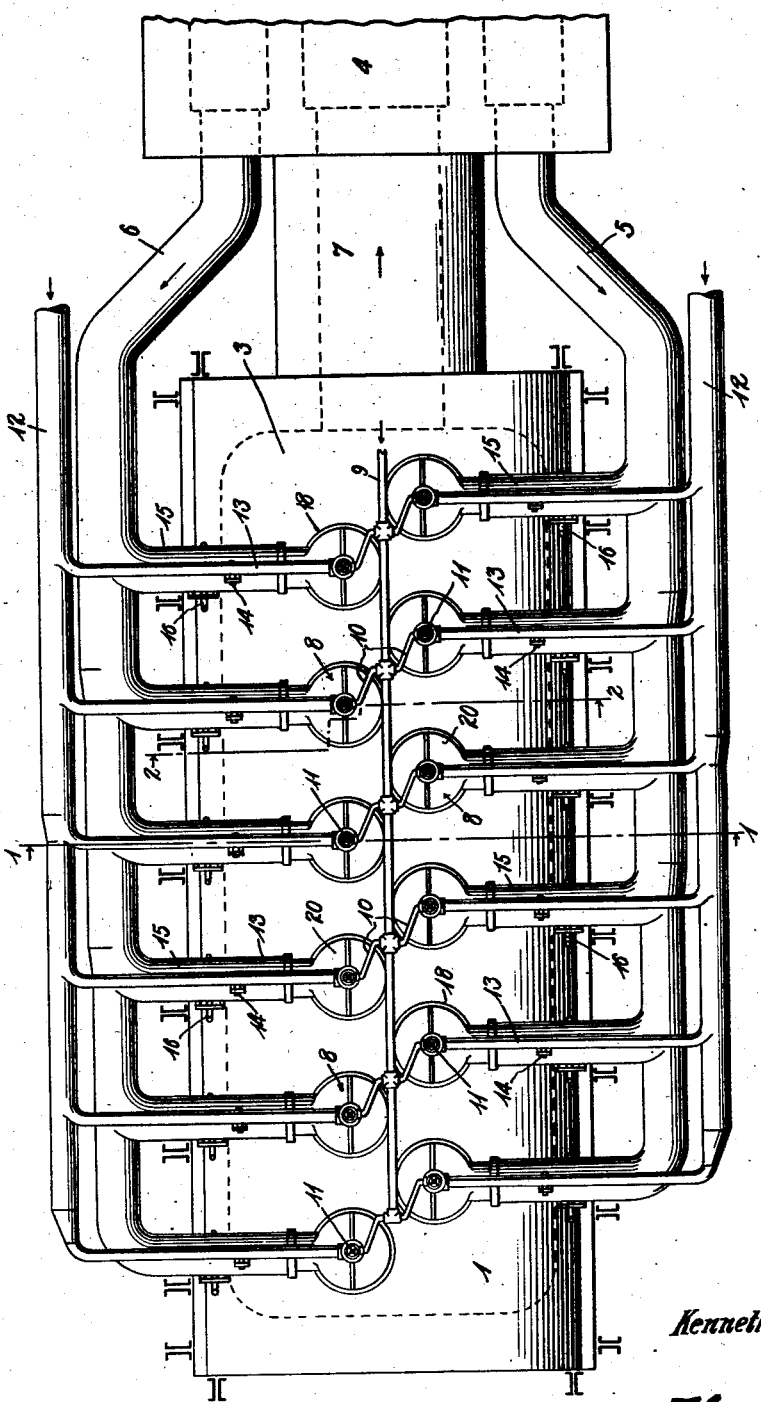

The numeral 1 designates a furnace of the open-hearth type. Within the furnace is the usual hearth 2. The furnace has the usual arched roof 3. A recuperator 4 of any well known construction is associated with the furnace. Air admitted to the furnace through the conduits 5 and 6 is preheated in the recuperator by heat extracted from the discharging furnace gases. These gases enter the recuperator through the conduit 7 leading from the furnace. Material is supplied to the furnace through opening 7' having a closure 7" and the molten material discharged through outlet 7ª.

Mounted in the roof or arch of the furnace, are a plurality of independent burners 8. These burners are arranged in longitudinal rows along the furnace hearth. The burners of one row are preferably staggered in relation to the burners of the adjacent row. The series of burners are positioned in the roof or arch of the furnace so as to subject substantially the entire surface of the hearth charge to the action of downwardly directed flames.

A fuel feeding line 9 (preferably oil or gas) is disposed between the parallel rows of burners 8. A branch line 10 leads from the fuel feed line 9 to each of the burners. Each burner is provided with a fuel controlling valve 11, such fuel valves being independently operable.

Primary and secondary air is admitted to each burner when oil is used as the fuel. The primary air is admitted to the burners through the conduits 12, one being disposed on each side of the furnace. Independent primary air feed lines 13 lead from such conduits, one line extending to each burner 8. Each line 13 is provided with an independently operable valve 14 for controlling the quantity of air admitted to each burner.

The secondary air for supporting combustion is preheated in the recuperator 4, attaining therein a temperature of say approximately 1500 to 2000° F. This heated air flows through the conduits 5 and 6 provided with branch lines 15, one line leading to each burner 8. Each branch line 15 is provided with an independently operable control valve 16 for independently regulating the quantity of air admitted to each burner of the series.

Both the primary and secondary air is admitted to the burners under the desired pressure, which may vary somewhat. By this regulation, the range, shape and intensity of the flame can be varied at will.

The burners are of like construction and all are mounted in the roof of the furnace in substantially the same way. A description of one burner and its mounting will, therefore, suffice for all.

Openings 17 are provided in the arch or roof of the furnace which overlie the hearth 2. Each opening receives a burner block 18 of suitable refractory material. Each block has an opening 19, the walls of which are of a desired shape.

The burner comprises a hood 20 fitting the upper portion of the burner block 18. This hood communicates with the branch air feeding line 15 for introducing the highly heated secondary air to the burner.

Supported by the hood in any suitable way, is a burner casing 21 that is vertically disposed. This casing enters the hood, terminating at a point adjacent the upper edge of the burner block 18. At its lower end the casing carries a deflector plate 22. This plate at its apex has an aperture 23 which is in alignment with the fuel feeding nozzle at the bottom of the fuel feeding line 24. The deflector plate 22 is provided with air orifices 25 for discharging primary air into the path of travel of the fuel. The primary air enters casing 21 through the branch air feeding line 13 in suitably regulated quantities.

The oil fed to the burner is admitted to the oil feed line 24 through the valve controlled line 10. It discharges through the burner nozzle 26, being there atomized by the primary air fed to the casing 21. The atomized fuel then passes through the aperture 23 of the deflector plate 22 and is thoroughly commingled with the large volume of secondary air entering the hood 20 and discharging around the orifice 23 of the deflector plate. Initial combustion takes place within the burner block, the flame progressively spreading and increasing in intensity as it nears the bath in the hearth, as clearly shown in Figures 2 and 4.

The air and fuel is admitted to each burner under desired pressure conditions and discharged from the burner so that the burner flames travel downwardly toward the bath at a substantial velocity. The flames moving in this direction at a substantial velocity, impinge upon the charge with considerable force and penetrate the spaces between superimposed pieces of iron or steel.

Figure 2:
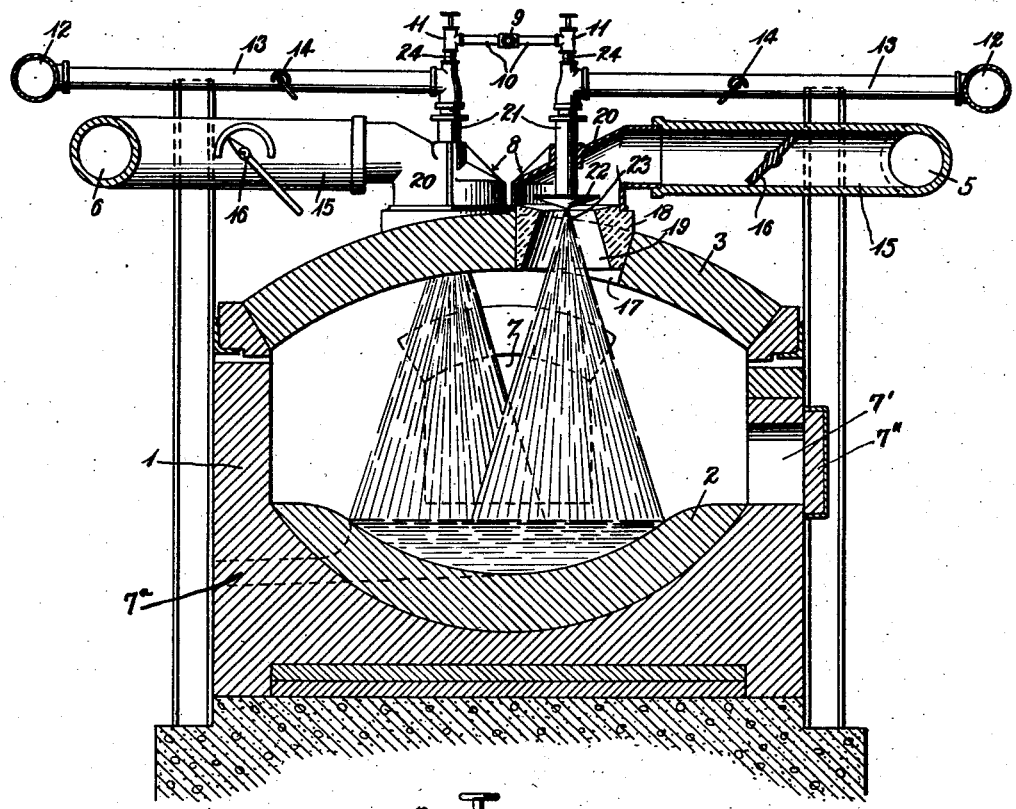
Fig. 2 is a sectional view on the line 1—1 of Figure 1.
Figure 3:
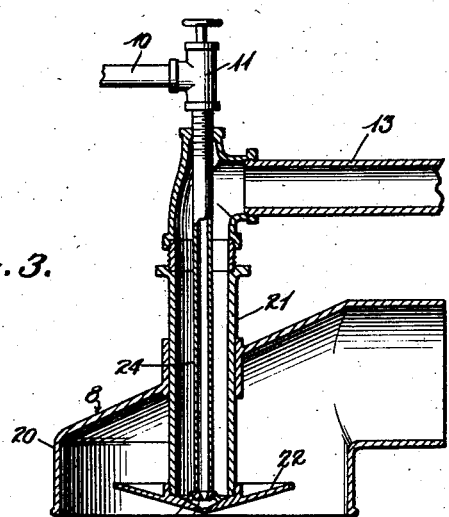
Fig. 3 is a sectional view of one of the burners.
Figure 4:
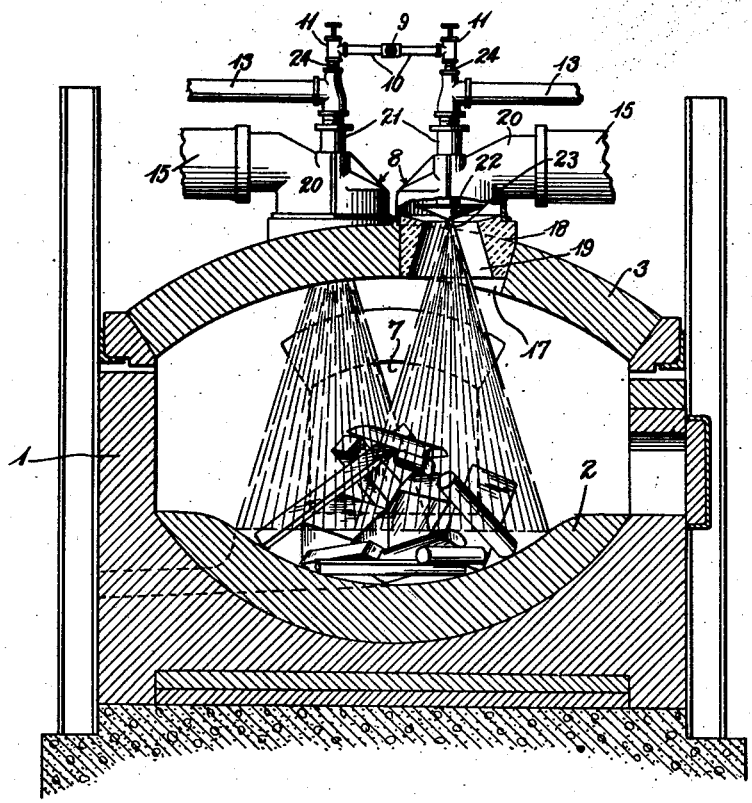
Fig. 4 is a sectional view on the line 2—2 of Figure 1 illustrating a charge of steel scrap or iron "pigs" in the hearth.

In this embodiment of the invention, as shown in Figures 2 and 4, the burners are so arranged and their flames so controlled that substantially the entire surface of the charge is subjected to the action of the downwardly directed flames. This insures a rapid and uniform heating of the contents of the hearth.

By using short intense flames, as illustrated in Figures 1 and 2, high temperatures may be attained. The flame temperature is preferably at its maximum at its point of contact with the surface of the charge. This temperature may vary from say 3100 to 3400° F. With a flame of this type, employed as here disclosed, the maximum heat release from the flame to the charge is obtainable.

It will be understood that the burner flames substantially cover the longitudinal surface of the hearth, just as effectively as they cover the transverse surface thereof, as illustrated in Figures 2 and 4. As stated, by so directing and distributing the flames there is substantially a uniform application of heat to the entire charge. This serves to materially increase the efficiency of the furnace. Of course, if the hearth be relatively small, a flame may be provided which at the point of contact with the charge substantially covers its entire surface.

In operation, the heating flames preferably should be directed downwardly in a plane substantially normal to the surface of the charge. It will be understood that the advantages of the process are realized by the use of downwardly directed, short, intense flames impinging on substantially the entire surface of the charge. These advantages may be obtained even though the angle of direction of the flame is varied considerably.

For illustrating one desirable use of the invention, the following description of a steel-making operation will be given,—

The burners are placed in full operation, the burner flames taking the courses disclosed in Figures 2 and 4. The usual supply of limestone is thrown on the hearth 2 of the furnace. A charge of scrap steel is then placed on the hearth. The flame temperature at the point of contact with the charge will be between 3200 and 3400° F. The flames moving downwardly under velocity penetrate the spaces between the pieces of steel scrap as shown in Figure 4. This results in a rapid heating of the metal.

When the steel has been thoroughly heated and just before melting is perceptible, pig iron is added to the charge in an amount that may approximate 25% of the metal charge. The flames continue to penetrate the loosely piled charge, serving to rapidly melt both the steel and pig iron.

By directing the short intense flames downwardly with considerable velocity over substantially the entire surface of the charge, the steel-making operation is materially expedited. When the steel-making operation is completed, the metal is tapped and cast in molds according to the usual practice and the operation, as is customary, is then repeated.

As will be apparent from the foregoing description, the process and apparatus is peculiarly applicable to the smelting of ores. In such an operation, the ore and reducing materials mixed therewith are subjected to the treating process herein described. The metal and slag formed as a result of the operation are withdrawn from the furnace and handled in the usual manner.

Having thus described my invention, what I claim is:

1. A process for treating material in an open hearth furnace which comprises charging a furnace with a predetermined amount of material to be treated, heating the material by means of a plurality of flames directed downwardly toward the hearth, regulating combustion conditions to produce a series of short spreading flames, and impinging the flames when substantially at their maximum temperature against the material along a substantially horizontal plane in which the flames cover substantially the entire surface of the hearth.

2. A heating process which comprises placing a charge of material to be heated on a furnace hearth, generating relatively short flame in the upper portion of the furnace directly above said charge, projecting such flame downwardly in an unobstructed path toward the hearth substantially at right angles thereto, impinging such flame onto said charge over substantially the entire area thereof, and controlling the generation of the flame whereby impingement occurs while the flame is at substantially its maximum temperature.

3. A process of treating material in a furnace comprising placing a charge on a hearth, introducing fuel and air to the furnace and burning the fuel to produce flame directed downwardly in an unobstructed path toward the material on the hearth in a direction approaching the vertical, and impinging the downwardly directed flame when at substantially its maximum temperature on at least the major area of the entire surface of the material on the hearth.

4. A heating process comprising placing a charge of material to be heated on a furnace hearth, generating a plurality of relatively short flames in the upper portion of the furnace directly above the charge, in directing such flames downwardly an unobstructed path toward the hearth and substantially perpendicularly thereto, impinging such downwardly directed flames onto the surface of the charge over substantially the entire area thereof and controlling the generation of the flames whereby such impingement occurs while the flames are at substantially their maximum temperatures.

5. A heating process comprising placing a charge of material to be heated on a furnace hearth, generating a plurality of flames at points above the hearth, directing such flames downwardly in an unobstructed path toward the hearth substantially perpendicularly thereto, and impinging the downwardly directed flames when at substantially their maximum temperatures onto the charge over at least the major portion of its entire surface.

6. A process for heating material in an open-hearth furnace which comprises charging a hearth with the material to be heated, heating the charge by flame directed downwardly toward the hearth, regulating the combustion conditions to produce short flame impinging against the material when at approximately its maximum temperature along a substantially horizontal plane in which the flame covers substantially the entire surface of the hearth.

7. A process of treating material in a furnace comprising placing a charge on a hearth, generating flame from an intimately commingled combustible mixture of fluid fuel and air at a point above the hearth, projecting such flame downwardly in an unobstructed path toward the hearth, regulating combustion conditions to produce intense flame temperature at points adjacent the hearth, and impinging such flame when moving under a substantial velocity onto the hearth over at least substantially the major portion of the entire surface of the charge.

In testimony whereof I affix my signature.

KENNETH M. SIMPSON.

CERTIFICATE OF CORRECTION.

Patent No. 1,812,563.                      Granted June 30, 1931, to

KENNETH M. SIMPSON.

It is hereby certified that error appears in the printed specification of the above numbered patent requiring correction as follows: Page 3, line 60, claim 4, after "charge" strike out the word "in" and insert the same after the word "downwardly" in line 61; and that the said Letters Patent should be read with this correction therein that the same may conform to the record of the case in the Patent Office.

Signed and sealed this 6th day of October, A. D. 1931.

M. J. Moore,
Acting Commissioner of Patents.

(Seal)